United States Patent [19]

Wood

[11] Patent Number: 4,677,472

[45] Date of Patent: Jun. 30, 1987

[54] APPARATUS FOR INSPECTING THE INTERIOR OF A PIPELINE

[75] Inventor: Eric Wood, Wellingborough, England

[73] Assignee: Insituform Group Limited, Isle of Man

[21] Appl. No.: 799,797

[22] Filed: Nov. 21, 1985

[30] Foreign Application Priority Data

Nov. 21, 1984 [GB] United Kingdom ............... 8429339

[51] Int. Cl.⁴ .............................................. H04N 7/18
[52] U.S. Cl. ..................................... 358/100; 358/93
[58] Field of Search ................... 358/100, 99, 93, 229; 324/220; 104/138 G

[56] References Cited

U.S. PATENT DOCUMENTS

| | | | |
|---|---|---|---|
| 3,764,736 | 10/1973 | Kosky et al. | 358/100 |
| 3,852,527 | 12/1974 | McQuivey | 358/100 |
| 4,131,914 | 12/1978 | Bricmont | 358/100 |
| 4,255,762 | 3/1981 | Takegasu | 358/100 |
| 4,281,876 | 8/1981 | Lansberry | 358/100 |
| 4,432,931 | 2/1984 | Lockett | 358/100 X |
| 4,532,545 | 7/1985 | Hanson | 358/100 |
| 4,586,079 | 4/1986 | Cooper, Jr. et al. | 358/100 |

FOREIGN PATENT DOCUMENTS 0038641  2/1985  Japan ................................ 358/100

Primary Examiner—James J. Groody
Assistant Examiner—Victor R. Kostak
Attorney, Agent, or Firm—Fred Philpitt

[57] ABSTRACT

An apparatus for the inspection of the interior of pipelines or passageways, which apparatus includes a T.V. inspection camera and a cable connected to the camera for both supplying electricity and for pulling the assembly along the pipeline or passageway, the camera being arranged at an angle to the pipeline or passageway axis, and by actuating a drive means of the assembly the cable forms a drive member and is propelled through the assembly pushing the camera up a lateral pipeline for the inspection of same.

8 Claims, 6 Drawing Figures

APPARATUS FOR INSPECTING THE INTERIOR OF A PIPELINE

This invention relates to pipeline inspection apparatus, and in particular concerns an apparatus for the manipulation of a camera or other examination device when in a pipeline.

Specifically, the apparatus is suitable for manipulating a camera to enable it to be inserted into a lateral pipeline which is a pipeline which meets a main pipeline at an angle. A lateral pipeline may be provided for example to provide connection between a domestic dwelling and a main sewer or a main gas line. Frequently, there is a need for enabling the inspection of the lateral pipeline in order to ascertain its state of repair, or for the purposes of detecting a leak.

There are known T.V. inspection apparatus which can be inserted in and moved along main pipelines and passageways which are located underground, the camera sending back signals to a remotely located monitor, for example in an inspection truck located at ground level, but heretofore there has been no means for enabling the inspection of lateral pipelines or passageways, without inserting the inspection camera from the consumer end, i.e. from a domestic dwelling, which in the majority of cases is unacceptable to the occupier of the dwelling.

According to the present invention there is provided apparatus for enabling the inspection of lateral pipelines or passageways comprising a support assembly for location in the main pipeline or passageways into which the lateral pipeline or passageway opens, a camera by which the interior of the lateral pipeline or passageway can be examined from a remote location, an elongated drive such as a cable member having one end connected to the camera and being connected to drive means of the assembly, the assembly being positionable so that the camera can be propelled up the lateral pipeline or passageway by driving said elongated drive member through the apparatus in the direction of its length.

Preferably said drive means is positioned adjustable in relation to the rest of the assembly whereby the camera can be adjusted between a transport position in which a viewing end of the camera faces axially of the main pipeline or passageway, and an inspection position in which the said viewing end faces in a direction transverse to said axial direction, and the camera can be propelled in said direction transverse by driving the elongated member, which member undergoes a change in direction in passing through the drive means.

Preferably also, said drive means comprises a pair of drive pulleys defining a web through which the elongated member passes, and a drive motor drivingly connected to one of said pulleys. The said pulley may be carried between two plates to form a drive unit, and the unit is tiltable between said positions by being pivotably connected to the piston and cylinder respectively, by tie bars and tie rods, of a piston and cylinder device forming part of the assembly.

To appreciate more fully the principles of the present invention, an example is illustrated in the accompanying drawing, wherein.

Figure 1:
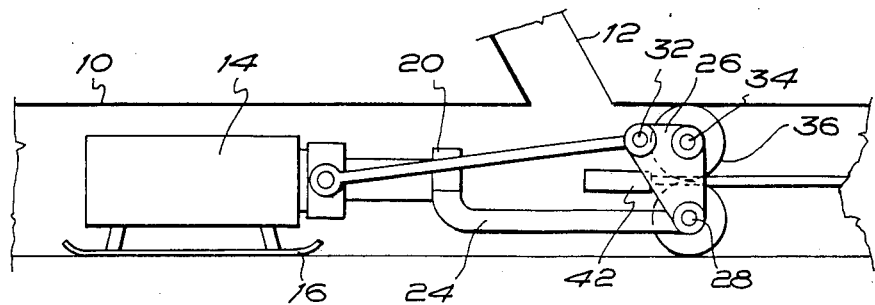
FIG. 1 shows the apparatus in a main underground pipeline.
Figure 2:
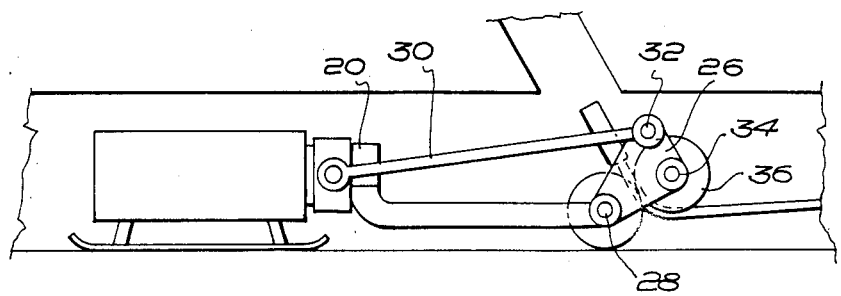
FIG. 2 shows the apparatus of FIG. 1 but in a different position.
Figure 5:
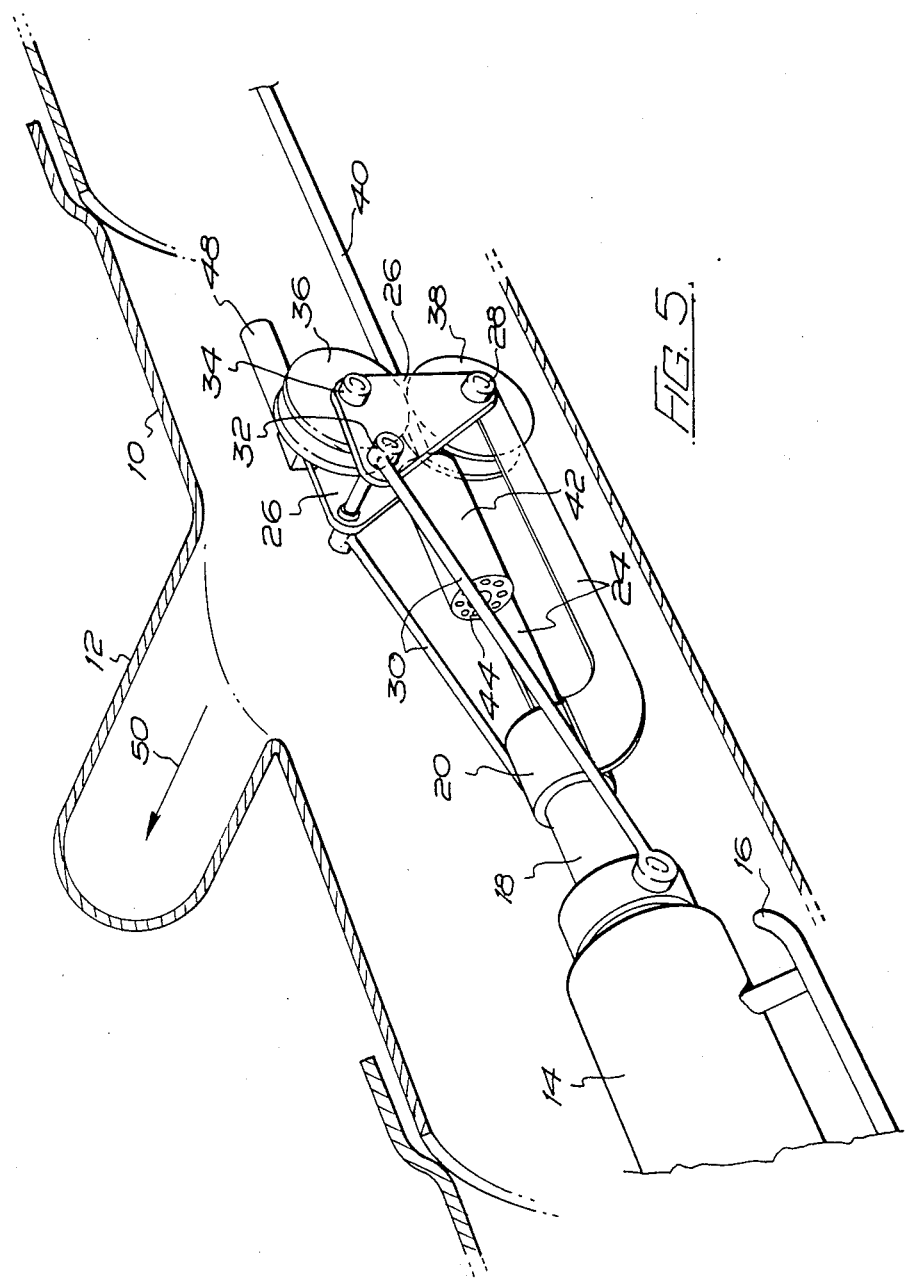
FIG. 5 is a broken away perspective view showing the apparatus in the FIG. 1 position.
Figure 6:
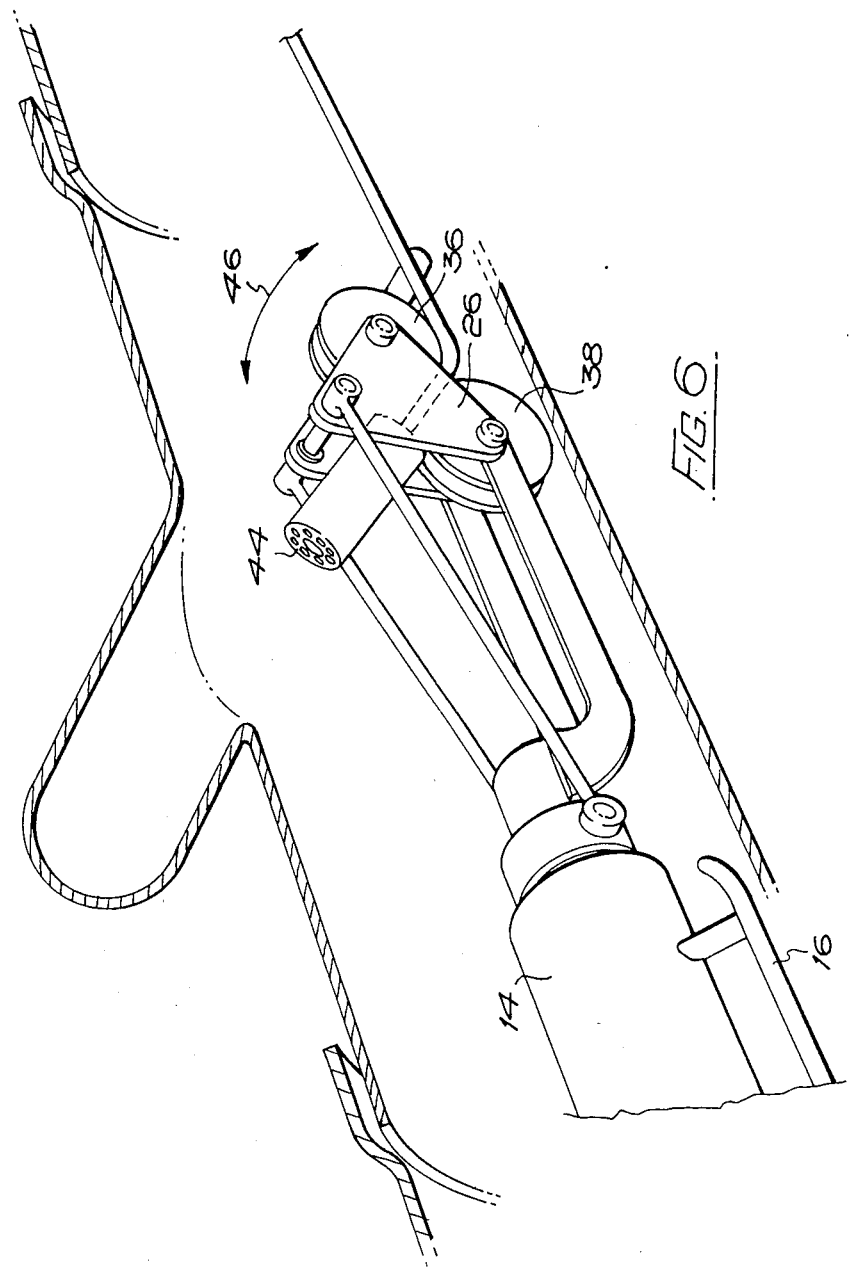
FIG. 6 is a view similar to the view of FIG. 5, but showing the apparatus in the FIG. 2 position.

Referring to the drawings, an underground pipe 10 is shown as having a lateral connecting pipe 12 the interior of which is to be examined. Inside the main passageway has been inserted an assembly comprising an actuator 14 which is supported on skids 16. The actuator has locking means (not shown) for locking the actuator against the pipe 10 in any position to which the actuator is moved so that the apparatus will remain in fixed position on pipe 10 during inspection of lateral 12. The actuator 14 is a piston and cylinder device adapted by suitable control means located above ground (not shown) to move piston 18 between a projecting position as shown in FIGS. 1 and 5, and a contracted position as shown in FIGS. 2 and 6. To the piston 18 is attached a collar 20 having jacking arms 24, the jacking arms 24 connecting to a pair of plates 26 of triangular shape, the connection being at an axis of pivoting 28. A pair of rods 30 couple the body of the actuator 14 to another axis 32 of the plates 26, and there is a third axis 34 defined by the plates, and on which axis if mounted a drive wheel 36. An idler wheel 38 is mounted on axis 28. The wheels 36 and 38 drivingly engage a cable 40 to the end of which is attached a television inspection camera 42 of the type known as "pear point camera" having a viewing end 44. The cable 40 serves not only as a drive and pulling member, but it also houses the electrical service lines connecting camera 42 to a control unit and viewing monitor at ground level.

Figure 3:
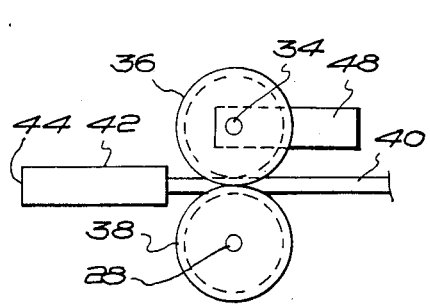
FIG. 3 shows a portion of the support assembly, to an enlarged scale, corresponding to the FIG. 1 position.
Figure 4:
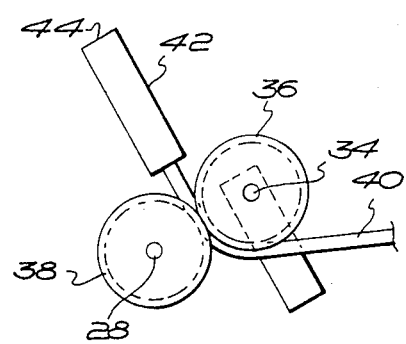
FIG. 4 is a view similar to FIG. 3 but in the position corresponding to FIG. 2.

In FIGS. 1 and 5, the viewing end 44 is shown as being aligned with the lengthwise direction of a pipe 10, and this is the transport position of the camera. In this position, the cable 40 serves as the means of pulling the assembly into and along the pipe 10. When it is desired to inspect a lateral passage such as passage 12, it is simply a matter, by monitoring from ground level, of contracting the actuator 14 to the FIGS. 2 and 6 position, which causes the plates 26 to pivot as shown by arrow 46 in FIG. 6 to the position shown in FIGS. 2 and 6 in which the end 44 of the camera faces the lateral 12. FIGS. 3 and 4 illustrate more clearly the two positions of the camera. If drive motor 48 carried by the plates 26 and drivingly coupled to wheel 36 is actuated, the camera 44 is caused to be driven (by control from ground level) up into the lateral 12 as indicated by arrow 50 in FIG. 5, the two wheels 36 and 38 forming the drive means for the cable 40 which although strong in tension can be fed in a curved path when it is drivingly engaged by means of the said wheels 36 and 38.

Full control of the actuator, camera and motor 48 can be effected from ground level providing full inspection information to the control operator.

The apparatus according to the present invention provides an extremely useful means for the inspection of main and lateral pipelines and passageways. It is mainly useful in cases where the pipelines to be inspected are located underground, but quite clearly the apparatus can be used in above ground applications.

What is claimed is:

1. Pipeline inspection apparatus for use in inspecting a lateral pipeline that enters a generally horizontal main pipeline comprising
   (A) an inspection camera that is sized to fit within said pipelines,
   (B) an elongated transporting member having one end connected to said camera and which is adapted to initially move in a generally horizontal path along the interior of said main pipeline, said elongated transporting member having sufficient flexibility that a portion thereof can be deflected at an angle relative to the remainder of the elongated transporting member,
   (C) a supporting assembly sized to fit within and rest upon the lower internal surface of said main pipeline, said supporting assembly being arranged to support the portion of said elongated transporting member that is adjacent said camera and including
      (1) drive means which engages said elongated transporting member so that activation of the drive means can move said elongated transporting member longitudinally through said pipelines, and
      (2) adjustment means for adjusting the angular dispostion of a portion of said elongated flexible transporting member that is adjacent said camera so that the camera is movable between a transport position in which the viewing end of the camera faces axially of the main pipeline, and an inspection position in which the said viewing end of the camera faces a direction at an angle to said axial direction, and the camera can be propelled in said angled direction by activating said drive means, the elongated flexible transporting member undergoing a change in direction in passing through the support assembly.

2. Apparatus according to claim 1 wherein said drive means comprises a pair of pulleys defining a nip through which said elongated transporting member passes and a drive motor drivingly connected to one of said pulleys.

3. Apparatus according to claim 2 wherein said support assembly includes a piston and cylinder device and wherein said pulleys are carried between two plates to form a drive unit, and the drive unit is tiltable between the transport position and the inspection position by being pivotably connected to said piston and cylinder by tie bars and tie rods.

4. Apparatus according to claim 1 wherein said elongated transporting member serves for pulling the apparatus along the main pipeline and also contains an electrical cable for supplying electrical power to the camera.

5. Apparatus according to claim 2 wherein said elongated transporting member serves for pulling the apparatus along the main pipeline and also contains an electrical cable for supplying electrical power to the camera.

6. Apparatus according to claim 3 wherein said elongated transporting member serves for pulling the apparatus along the main pipeline and also contains an electrical cable for supplying electrical power to the camera.

7. Apparatus according to claim 1 additionally including means for locking the support assembly in position in the main pipeline to thereby prevent displacement of same as the elongated transporting member is being propelled through the lateral pipeline.

8. Apparatus according to claim 7 wherein the locking operation of the apparatus can be controlled and monitored from ground level.

* * * * *

Notice of Adverse Decision in Interference

In Interference No. 102,102, involving Patent No. 4,677,472, E. Wood, APPARATUS FOR INSPECTING THE INTERIOR OF A PIPELINE, final judgment adverse to the patentee was rendered July 26, 1989, as to claims 1 and 2.

[*Official Gazette September 19, 1989.*]